US009169854B2

(12) United States Patent
Kim

(10) Patent No.: US 9,169,854 B2

(45) Date of Patent: Oct. 27, 2015

(54) PRESSURE INTENSIFIER FOR DISCHARGING FLUID AT CONSTANT FLOW RATE

(75) Inventor: Yoo Jung Kim, Changwon-si (KR)

(73) Assignees: DAEHAN SYSTEC CO., LTD., Changwon-Si, Gyeongsangnam-Do (KR); Yoo Jung Kim, Changwon-Si, Gyeongsangnam-Do (KR)

( * ) Notice: Subject to any disclaimer, the term of this patent is extended or adjusted under 35 U.S.C. 154(b) by 349 days.

(21) Appl. No.: 13/884,133

(22) PCT Filed: Sep. 20, 2011

(86) PCT No.: PCT/KR2011/006926

§ 371 (c)(1),
(2), (4) Date: May 8, 2013

(87) PCT Pub. No.: WO2012/064017

PCT Pub. Date: May 18, 2012

(65) Prior Publication Data

US 2013/0227941 A1 Sep. 5, 2013

(51) Int. Cl.

| | |
|---|---|
| ***F16D 31/02*** | (2006.01) |
| ***F15B 15/18*** | (2006.01) |
| ***F15B 3/00*** | (2006.01) |
| ***F15B 13/042*** | (2006.01) |

(52) U.S. Cl.

CPC . *F15B 15/18* (2013.01); *F15B 3/00* (2013.01); *F15B 13/042* (2013.01)

(58) Field of Classification Search

CPC .......... F15B 3/00; F15B 13/022; F15B 15/18; F16H 61/461

USPC ........................................................... 60/419

See application file for complete search history.

(56) References Cited

U.S. PATENT DOCUMENTS

| | | | | |
|---|---|---|---|---|
| 6,279,317 | B1 * | 8/2001 | Morgan | 60/413 |
| 6,378,301 | B2 * | 4/2002 | Endo et al. | 60/419 |
| 6,438,951 | B2 * | 8/2002 | Morgan | 60/419 |
| 7,000,386 | B1 * | 2/2006 | Morgan | 60/419 |
| 8,186,154 | B2 * | 5/2012 | Nelson et al. | 60/419 |

* cited by examiner

*Primary Examiner* — Michael Leslie

(74) *Attorney, Agent, or Firm* — Hauptman Ham, LLP

(57) ABSTRACT

A pressure intensifier for ejecting fluid at a constant flow rate includes a hydraulic pump, a hydraulic motor, a supply channel, a first control unit, and a second control unit. The hydraulic pump pumps an introduced fluid to eject the fluid through an ejection channel. The hydraulic motor is driven by the introduced fluid and drives the hydraulic pump to cause the fluid ejected by the hydraulic pump to be intensified. The supply channel allows the hydraulic pump and the hydraulic motor to be supplied with the fluid. The first control unit opens or closes the supply channel, and the second control unit operates the first control unit to cause the first control unit to close the supply channel if the fluid ejected through the ejection channel is larger than a predetermined pressure.

4 Claims, 4 Drawing Sheets

10

PRESSURE INTENSIFIER FOR DISCHARGING FLUID AT CONSTANT FLOW RATE

CROSS REFERENCE TO RELATED APPLICATION

This application claims the priority of Korean Patent Application No. 10-2010-0110206, filed on Nov. 8, 2010 in the KIPO (Korean Intellectual Property Office). Further, this application is the National Phase application of International Application No. PCT/KR2011/006926 filed Sep. 20, 2011, which designates the United States and was published in Korean.

BACKGROUND OF THE INVENTION

1. Field of the Invention

The present invention relates to a pressure intensifier, and more particularly, to a pressure intensifier for ejecting fluid at a constant flow rate, which can intensify hydraulic pressure to required pressure using the flow rate and pressure set up in an existing equipment.

2. Description of the Related Art

Generally, a pressure intensifier is a cylindrical type apparatus, of which the ejection flow rate is relatively small and irregular, and which causes the pressure introduced from a hydraulic pump to be increased up to twenty times, thereby creating a pressure up to about 4,000 to 6,000 kgf/cm$^2$. Such a pressure intensifier has been widely used in tall processing and mechanical machining industries, automobile industries, stone and tile industries, aircraft industries, food processing industries, paper industries, and the like. Hereinafter, the principle of the pressure intensifier as described above will be briefly reviewed as follows. That is, the pressure intensifier is provided with a hydraulic motor and a hydraulic pump which are different in cross sectional area, wherein a fluid is introduced to the hydraulic motor having a larger cross sectional area, whereby a fluid with the constant flow rate and higher hydraulic pressure is ejected through the hydraulic pump having a smaller cross sectional area.

SUMMARY OF THE INVENTION

However, in the prior art described above, the pressure of the fluid ejected from the pressure intensifier might have been frequently larger than the pressure required by a device connected to the pressure intensifier. As such, the larger pressure than required causes the device connected to the pressure intensifier to be broken or damaged.

Further, the conventional pressure intensifier could not continuously eject fluid continuously. Thus, there is a problem in that the pressure intensifier could be neither installed nor applied to the existing equipment which allows the hydraulic motor and the hydraulic cylinder to continuously operate.

Accordingly, the present invention is conceived to solve the aforementioned problems in the prior art. An object of the present invention is to provide a pressure intensifier for ejecting fluid at a constant flow rate, which may cause hydraulic pressure to be increased up to a predetermined pressure to prevent a device connected to the pressure intensifier from being broken and damaged.

Another object of the present invention is to provide a pressure intensifier for ejecting fluid at a constant flow rate, which causes a fluid with an intensified pressure to be continuously ejected at the constant flow rate so that the pressure intensifier can be installed and applied to a conventional equipment for continuously operating the hydraulic motor and the hydraulic cylinder at a lower pressure.

A pressure intensifier according to the present invention for achieving the objects comprises a hydraulic pump, a hydraulic motor, a supply channel, a first control unit, and a second control unit. The hydraulic pump pumps an introduced fluid to eject the fluid through an ejection channel. The hydraulic motor is driven by the introduced fluid and drives the hydraulic pump to cause the fluid ejected by the hydraulic pump to be intensified. The supply channel allows the hydraulic pump and the hydraulic motor to be supplied with the fluid. The first control unit opens or closes the supply channel, and the second control unit operates the first control unit to cause the first control unit to close the supply channel if the fluid ejected through the ejection channel is larger than a predetermined pressure.

It is preferable that the first control unit of the present invention is provided with a first control valve and a first working channel. The first control valve is installed in the supply channel to open or close the supply channel. Further, the first working channel is connected to the first control valve to cause the fluid of the supply channel to be supplied to the first control valve so that the first control valve operates to close the supply channel. In addition, it is preferable that the second control unit opens or closes the first working channel.

It is preferable that the second control unit of the present invention is provided with a second control valve and a second working channel. The second control valve is installed in the first working channel to open the first working channel if the hydraulic pressure of the fluid ejected through the ejection channel is larger than a predetermined pressure. Further, it is preferable that the second working channel is connected to the second control valve to cause the fluid of the ejection channel to be supplied to the second control valve so that the second control valve operates.

Meanwhile, the second control unit according to the present invention may be provided with a second control valve, a pressure sensor, and a controller. The second control valve is installed in the first working channel to open or close the first working channel. The pressure sensor detects the hydraulic pressure in the ejection channel. The controller operates the second control valve to open the first working channel if the hydraulic pressure detected in the pressure sensor is larger than the predetermined pressure.

DESCRIPTION OF THE PREFERRED EMBODIMENT

Figure 1:
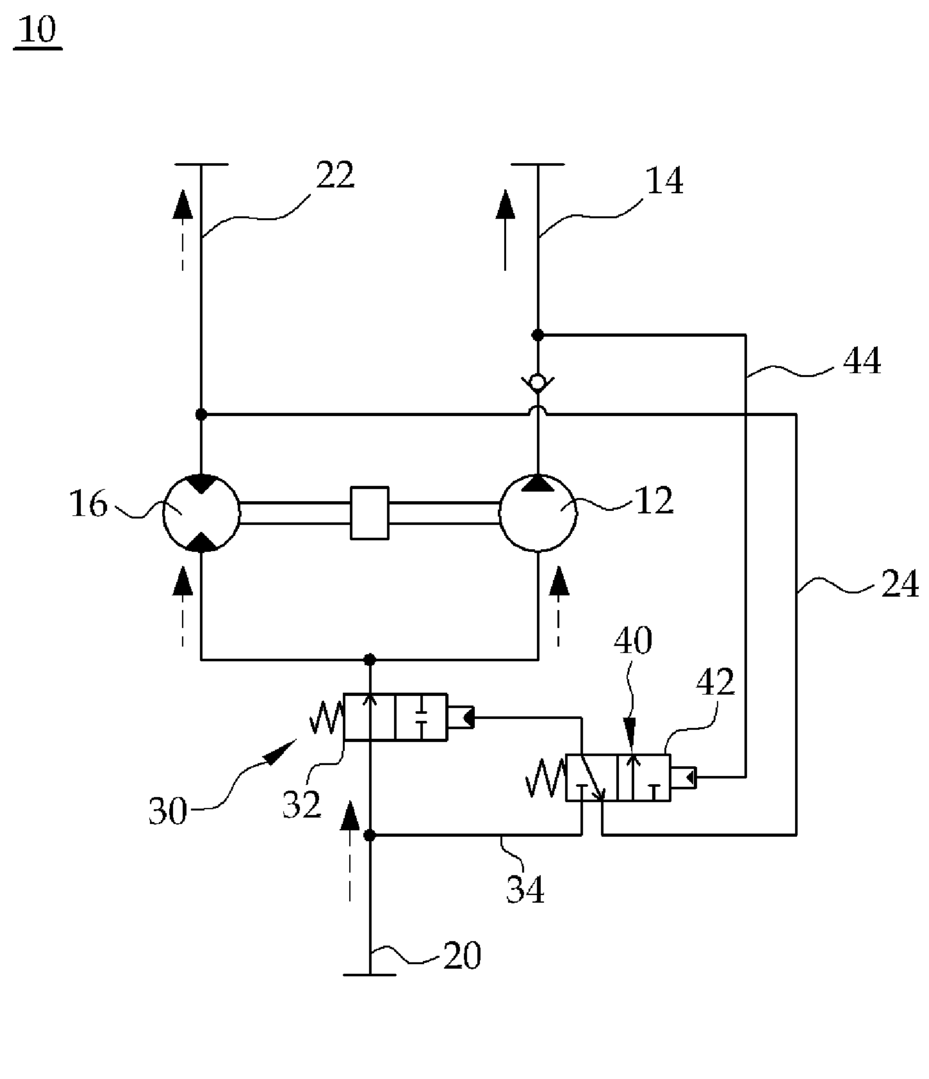
FIG. 1 is a circuit diagram illustrating a first embodiment of a pressure intensifier according to the present invention.
Figure 2:
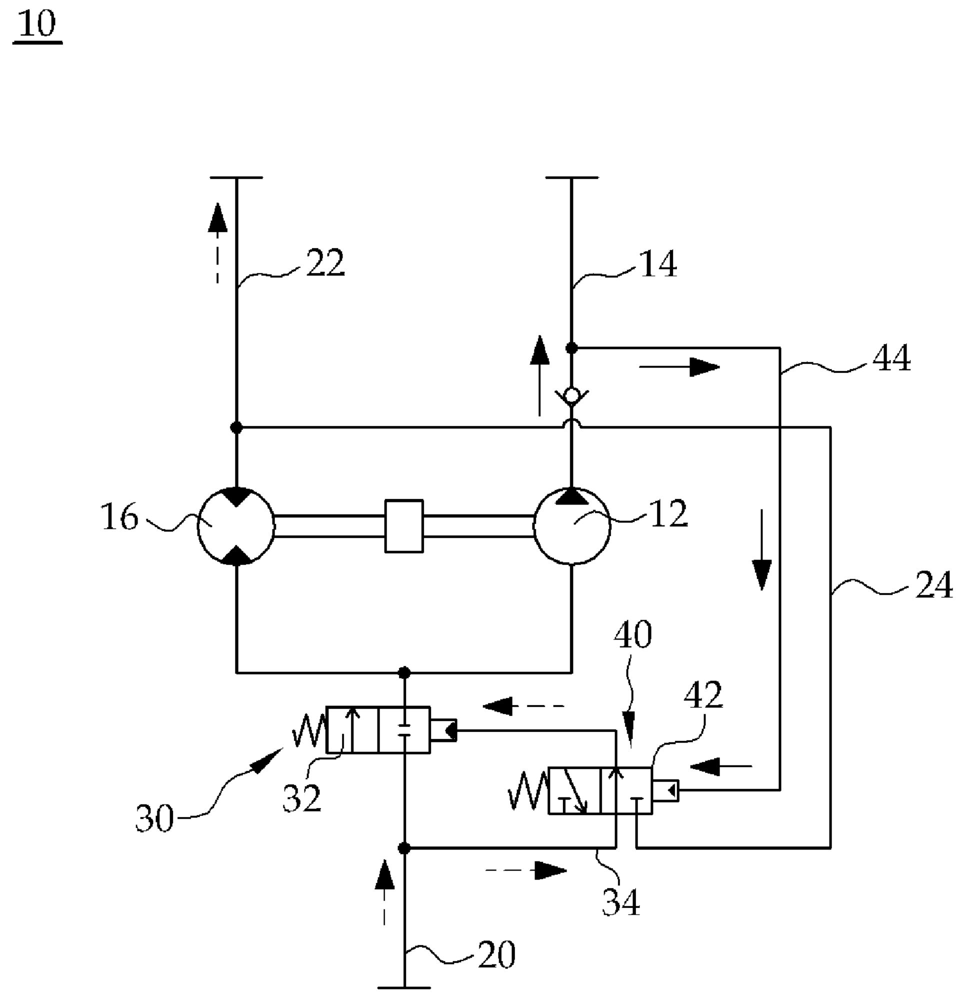
FIG. 2 is a circuit diagram illustrating a state where the first embodiment shown in FIG. 1 operates.
Figure 3:
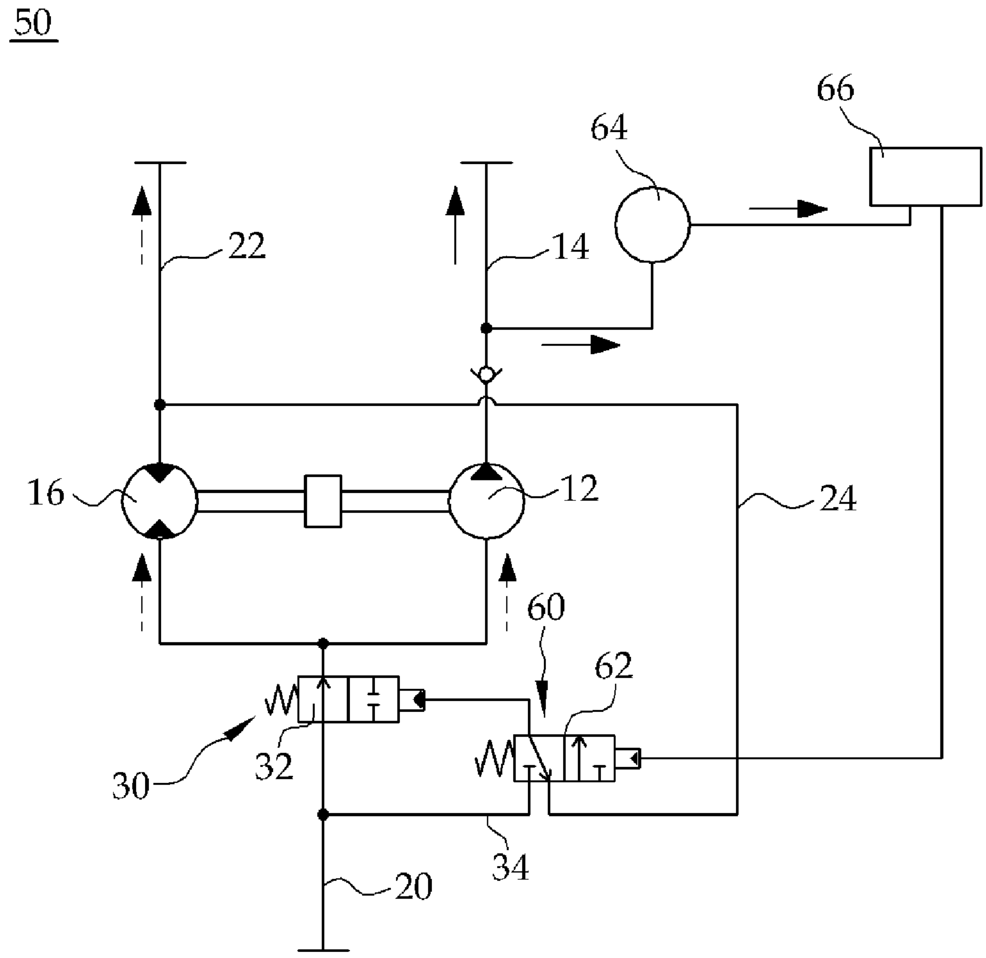
FIG. 3 is a circuit diagram illustrating a second embodiment of the pressure intensifier according to the present invention.
Figure 4:
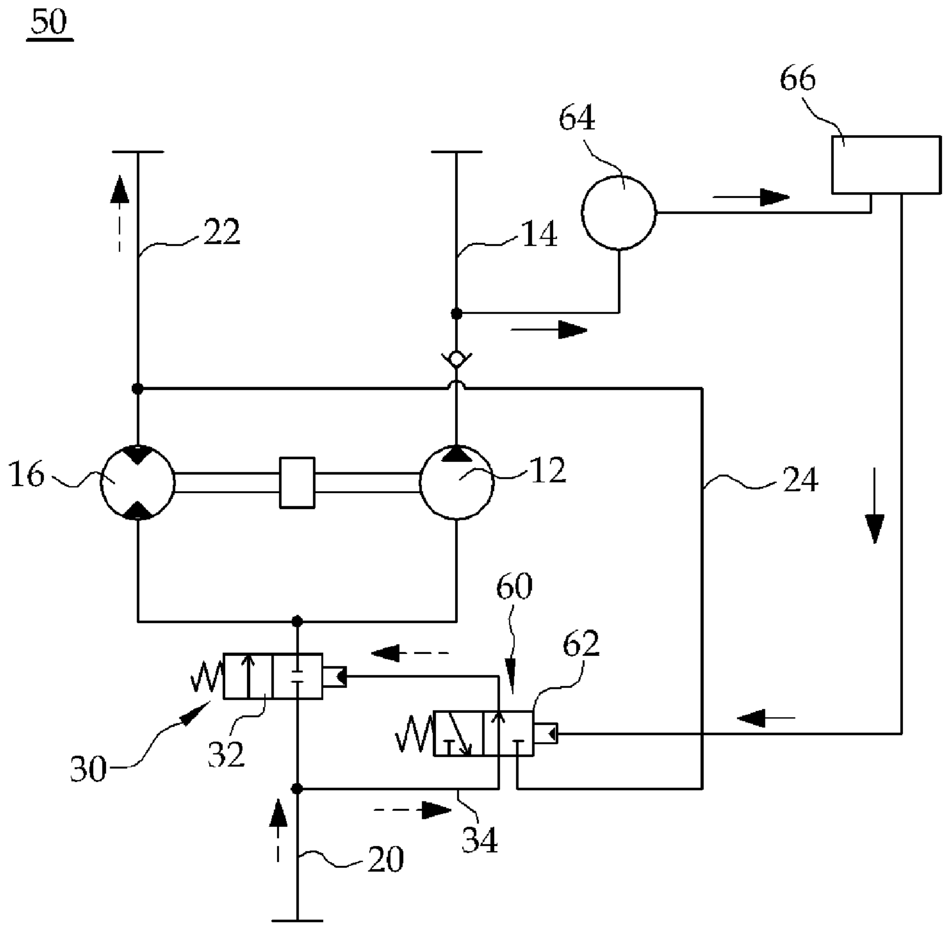
FIG. 4 is a circuit diagram illustrating a state where the second embodiment shown in FIG. 3 operates.

Hereinafter, preferred embodiments of a pressure intensifier for ejecting fluid at a constant flow rate according to the present invention will be described in detail with reference to the accompanying drawings. FIG. 1 is a circuit diagram illustrating a first embodiment of a pressure intensifier for ejecting fluid at a constant flow rate according to the present invention;

FIG. 2 is a circuit diagram illustrating a state where the first embodiment shown in FIG. 1 operates; FIG. 3 is a circuit diagram illustrating a second embodiment of the pressure intensifier according to the present invention; and FIG. 4 is a circuit diagram illustrating a state where the second embodiment shown in FIG. 3 operates. Through FIGS. 1 to 4, the arrows represented by dotted lines indicate a lower hydraulic pressure while the arrows represent by solid lines indicate a higher hydraulic pressure which has been intensified.

Firstly, referring to FIGS. 1 and 2, a first embodiment 10 of the present invention will be described. A pressure intensifier according to the first embodiment 10 comprises a hydraulic pump 12, a hydraulic motor 16, a supply channel 20, a first control unit 30, and a second control unit 40.

The hydraulic pump 12 pumps an introduced fluid to eject the fluid through an ejection channel 14. The hydraulic motor 16 is driven by the hydraulic pressure of the introduced fluid and drives the hydraulic pump 12 so that the hydraulic pump 12 intensifies the hydraulic pressure. The supply channel 20 allows the hydraulic pump 12 and the hydraulic motor 16 to be supplied with the fluid, as shown in FIGS. 1 and 2. Meanwhile, the fluid which has driven the hydraulic motor 16 is discharged through a primary discharge channel 22 to a hydraulic tank.

The first control unit 30 opens or closes the supply channel 20, and the second control unit 40 operates the first control unit 30 to cause the first control unit 30 to close the supply channel 20 if the hydraulic pressure of the fluid ejected through the ejection channel 14 is larger than a predetermined pressure.

The first control unit 30 is provided with a first control valve 32 and a first working channel 34. The first control valve 32 is installed in the supply channel 20 to open or close the supply channel 20. Further, the first working channel 34 is connected to the first control valve 32 to cause the fluid of the supply channel 20 to be supplied to the first control valve 32 so that the first control valve 32 operates to close the supply channel 20. The first working channel 34 is opened or closed by the second control unit 40.

The second control unit 40 is provided with a second control valve 42 and a second working channel 44. The second control valve 42 is installed in the first working channel 34 to open the first working channel 34 if the hydraulic pressure of the fluid ejected through the ejection channel 14 is larger than a predetermined pressure. Further, the second working channel 44 is connected to the second control valve 42 to cause the fluid of the ejection channel 14 to be supplied to the second control valve 42 so that the second control valve 42 operates. In addition, a secondary discharge channel 24 is connected between the second control valve 42 and the primary discharge channel 22 so that the fluid supplied to the second control valve 42 may be discharged to the primary discharge channel 22.

If the intensified hydraulic pressure is larger than the predetermined pressure, the second control valve 42 is driven by the fluid in the ejection channel 14 to open the first working channel 34, as shown in FIG. 2. Accordingly, the fluid introduced through the supply channel 20 is supplied to the first control valve 32. The supplied fluid causes the first control valve 32 to operate. That is, the first control valve 32 closes the supply channel 20. Accordingly, the fluid supplied to the hydraulic pump 12 and the hydraulic motor 16 is blocked. Thus, the fluid supplied to the hydraulic pump 12 and the hydraulic motor 16 is blocked, so that the hydraulic pressure of the ejected fluid is no more increased. That is, the intensification of the hydraulic pressure is controlled.

Referring to FIGS. 3 and 4, a second embodiment 50 of the present invention is shown. Since a hydraulic pump, an ejection channel, a hydraulic motor, a driving member, a supply channel, a primary discharge channel, a secondary discharge channel, and a first control valve and a first working channel of a first control unit in the second embodiment 50 are respectively identical with the hydraulic pump 12, the ejection channel 14, the hydraulic motor 16, a driving member 18, the supply channel 20, the primary discharge channel 22, the secondary discharge channel 24, and the first control valve 32 and the first working channel 34 of the first control unit 30 in the first embodiment 10 in view of their basic configurations and functions, they are identified by the same reference numerals as those in the first embodiment, and therefore, their detailed descriptions will be omitted.

A second control unit 60 of the second embodiment 50 is provided with a second control valve 62, a pressure sensor 64, and a controller 66. The second control valve 62 is installed in the first working channel 34 to open or close the first working channel 34. Further, the pressure sensor 64 detects the hydraulic pressure in the ejection channel 14. The controller 66 operates the second control valve 62 to open the first working channel 34 if the hydraulic pressure detected in the pressure sensor 64 is larger than the predetermined pressure.

Referring to FIG. 4, the pressure sensor 64 transmits the detected pressure value of the ejection channel 14 to the controller 66 as an electrical signal. If the pressure value received by the controller 66 is larger than the predetermined pressure, the controller 66 transmits the electrical signal to the second control valve 62 in order to operate the second control valve 62. The second control valve 62 operates by means of the electrical signal transmitted from the controller 66.

As the second control valve 62 operates to open the first working channel 34, the fluid introduced from the supply channel 20 is supplied to the first control valve 32 through the first working channel 34. The first control valve 32 operates by means of the supplied fluid to close the supply channel 20. Accordingly, the fluid supplied to the hydraulic pump 12 and the hydraulic motor 16 is blocked, so that the hydraulic pressure of the fluid ejected through the ejection channel 14 can be no more increased. That is, the second embodiment 50 controls the intensification of the hydraulic pressure by means of a series of operations as described above.

According to the pressure intensifier for ejecting fluid at a constant flow rate of the present invention, if the hydraulic pressure in the ejection channel is larger than the predetermined pressure, the supply channel is closed by the first control unit and the second control unit, whereby it is possible to prevent the hydraulic pressure in the ejection channel from being intensified to be larger than the predetermined pressure. Accordingly, a device connected to the pressure intensifier may be prevented from being broken and damaged.

Further, according to the present invention, since fluid can be constantly ejected at a constant flow rate as well as under the intensified pressure, it is possible to apply the pressure intensifier of the present invention to the existing equipment for continuously operating the hydraulic motor and the hydraulic cylinder, thereby capable of intensifying the hydraulic pressure.

The embodiments as described above are no more than the description for the preferred embodiments of the present invention. The scope of the present invention is not limited to the embodiments described and illustrated above. It will be apparent that those skilled in the art can make various modifications, changes and substitutions thereto within the scope of the invention defined by the claims. Therefore, the true scope of the present invention should be defined by the technical spirit of the appended claims.

What is claimed is:

1. A pressure intensifier for ejecting fluid at a constant flow rate, comprising:

a hydraulic pump for pumping an introduced fluid to eject it through an ejection channel;

a hydraulic motor driven by the introduced fluid and driving the hydraulic pump to intensify hydraulic pressure of the fluid ejected by the hydraulic pump;

a supply channel for supplying the hydraulic pump and the hydraulic motor with the fluid;

a first control unit for opening or closing the supply channel; and a second control unit for operating the first control unit to cause the first control unit to close the supply channel if the hydraulic pressure of the fluid ejected through the ejection channel is larger than a predetermined pressure.

2. The pressure intensifier as claimed in claim 1, wherein the first control unit is provided with a first control valve installed in the supply channel to open or close the supply channel, and a first working channel connected to the first control valve to cause the fluid of the supply channel to be supplied to the first control valve so that the first control valve operates to close the supply channel; and wherein the second control unit opens or closes the first working channel.

3. The pressure intensifier as claimed in claim 2, wherein the second control unit is provided with a second control valve installed in the first working channel to open the first working channel if the hydraulic pressure of the fluid ejected through the ejection channel is larger than the predetermined pressure, and a second working channel connected to the second control valve to cause the fluid of the ejection channel to be supplied to the second control valve so that the second control valve operates.

4. The pressure intensifier as claimed in claim 2, wherein the second control unit includes:

a second control valve installed in the first working channel to open or close the first working channel;

a pressure sensor for detecting the hydraulic pressure in the ejection channel; and a controller for operating the second control valve to open the first working channel if the hydraulic pressure detected in the pressure sensor is larger than the predetermined pressure.

* * * * *